(12) United States Patent  
Wang et al.

(10) Patent No.: US 11,645,481 B2  
(45) Date of Patent: May 9, 2023

(54) METHOD AND APPARATUS FOR INVOKING RADIO FREQUENCY CARD FUNCTION

(71) Applicant: HUAWEI TECHNOLOGIES CO., LTD., Guangdong (CN)

(72) Inventors: Yao Wang, Shenzhen (CN); Feifan Yuan, Nanjing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 17/051,279

(22) PCT Filed: Apr. 25, 2019

(86) PCT No.: PCT/CN2019/084187  
§ 371 (c)(1),  
(2) Date: Oct. 28, 2020

(87) PCT Pub. No.: WO2019/214438  
PCT Pub. Date: Nov. 14, 2019

(65) Prior Publication Data  
US 2021/0049332 A1    Feb. 18, 2021

(30) Foreign Application Priority Data  
May 7, 2018  (CN) .......................... 201810428471.0

(51) Int. Cl.  
*G06K 7/10* (2006.01)  
*G06F 21/32* (2013.01)

(52) U.S. Cl.  
CPC ......... *G06K 7/10237* (2013.01); *G06F 21/32* (2013.01); *G06K 7/10257* (2013.01); *G06K 7/10297* (2013.01)

(58) Field of Classification Search  
CPC .......... G06K 7/10237; G06K 7/10257; G06K 19/07345; G06F 21/32; G06F 21/31; G06Q 20/34  
See application file for complete search history.

(56) References Cited

U.S. PATENT DOCUMENTS 8,249,654 B1 * 8/2012 Zhu .................. H04M 17/20  
455/558  
2011/0041102 A1 * 2/2011 Kim .................... G06F 3/04883  
345/173

(Continued)

FOREIGN PATENT DOCUMENTS

CN    102187353 A    9/2011  
CN    102255927 A    11/2011

(Continued)

*Primary Examiner* — Vernal U Brown  
(74) *Attorney, Agent, or Firm* — Womble Bond Dickinson (US) LLP

(57) ABSTRACT

A method and an apparatus for invoking a radio frequency card function are provided. The method includes: monitoring a feature input event, and obtaining feature information of a user from the feature input event obtained through monitoring; determining, based on a mapping relationship between the feature information and a radio frequency card type, a target radio frequency card type corresponding to the feature information of the user; and invoking a radio frequency card function corresponding to the target radio frequency card type. According to the method, different radio frequency card types may be distinguished based on the feature information of the user, so that the radio frequency card function corresponding to the target radio frequency card type corresponding to the feature information of the user can be invoked based on the feature information of the user. This further improves a card swiping success rate and improves user experience.

15 Claims, 9 Drawing Sheets

(56) References Cited

U.S. PATENT DOCUMENTS

| | | | |
|---|---|---|---|
| 2015/0348001 A1* | 12/2015 | Van Os | G06Q 20/3278 705/44 |
| 2017/0161684 A1 | 6/2017 | Chen et al. | |
| 2017/0185988 A1 | 6/2017 | Hu et al. | |

FOREIGN PATENT DOCUMENTS

| | | | |
|---|---|---|---|
| CN | 105491243 A | 4/2016 | |
| CN | 105528698 A | 4/2016 | |
| CN | 105678192 A | 6/2016 | |
| CN | 106157438 A | 11/2016 | |
| CN | 106204011 A | 12/2016 | |
| CN | 106792636 A | 5/2017 | |
| CN | 106815504 A | 6/2017 | |
| CN | 107507003 A | 12/2017 | |
| CN | 107545291 A | 1/2018 | |
| WO | 2010099473 A1 | 9/2010 | |

* cited by examiner

METHOD AND APPARATUS FOR INVOKING RADIO FREQUENCY CARD FUNCTION

This application is a National Stage of International Application No. PCT/CN2019/084187, filed on Apr. 25, 2019, which claims priority to Chinese Patent Application No. 201810428471.0, filed May 7, 2018, both of which are incorporated herein by in their entireties.

TECHNICAL FIELD

This application relates to the terminal field, and in particular, to a method and an apparatus for invoking a radio frequency card function.

BACKGROUND

Near field communication (NFC) is a short-range high-frequency radio technology, and the technology is evolved by integrating a non-contact radio frequency identification (RFID) technology and an interconnection and interworking technology. A chip that implements the NFC may perform identification and data exchange with a radio frequency transmit device within a short distance. Currently, the NFC technology is widely applied to a mobile terminal. Functions of various non-contact radio frequency cards (hereinafter referred to as "radio frequency cards") are integrated into the mobile terminal, and the mobile terminal communicates with the radio frequency transmit device, to implement various radio frequency card functions, such as a payment function, an access control function, and an identity authentication function.

However, in an existing application scenario, to facilitate use by a user, functions of two or more radio frequency cards are usually integrated into one mobile terminal. This relates to how to invoke a radio frequency card function corresponding to the mobile terminal when the user uses a specific radio frequency transmit device, so that the mobile terminal interacts with the radio frequency transmit device. Especially, when different types of a plurality of radio frequency cards are integrated into one mobile terminal, because different types of radio frequency cards correspond to different radio frequency transmit devices, when a radio frequency card that does not correspond to a type of radio frequency transmit device is used for card swiping, a card swiping failure may occur.

For example, a bus card is swiped on a bus baffle gate or a subway baffle gate, and a bank card is swiped on a point of sale (POS) machine (hereinafter referred to as a "POS machine"). If the bus card is swiped on the POS machine, card swiping fails. If the bank card is swiped on the bus baffle gate, card swiping also fails.

To overcome the foregoing problem, a currently common method is that the user selects one of the plurality of radio frequency cards as a default card, in other words, a default card function is preferentially invoked each time the user swipes a card, and when the radio frequency transmit device corresponds to the default card function, the card is successfully swiped. In other words, there is a probability of successfully swiping the card by setting the default card. The user usually selects a frequently used radio frequency card as the default card, so that there is a relatively high probability that the card is successfully swiped. However, once the radio frequency transmit device does not correspond to a type of the default card, card swiping fails, which lowers user experience.

SUMMARY

Embodiments of this application provide a method and an apparatus for invoking a radio frequency card function, to improve a card swiping success rate and user experience.

According to a first aspect of an embodiment of this application, a method for invoking a radio frequency card function is provided. The method includes: first monitoring a feature input event, and obtaining feature information of a user from the feature input event obtained through monitoring, where the feature input event is an event of inputting the feature information of the user; then determining, based on a mapping relationship between the feature information and a radio frequency card type, a target radio frequency card type corresponding to the feature information of the user; and finally invoking a radio frequency card function corresponding to the target radio frequency card type. In this embodiment of this application, the user may preset the mapping relationship between the feature information and the radio frequency card type on a mobile terminal. The mobile terminal may monitor the feature input event, obtain the feature information of the user from the feature input event, determine, based on the mapping relationship between the feature information and the radio frequency card type, the target radio frequency card type corresponding to the feature information of the user, and invoke the radio frequency card function corresponding to the target radio frequency card type. In other words, in this embodiment of this application, different radio frequency card types may be distinguished based on the feature information of the user, so that the radio frequency card function corresponding to the target radio frequency card type corresponding to the feature information of the user can be invoked based on the feature information of the user. This further improves a card swiping success rate and improves user experience.

In an embodiment, the feature information includes at least one of the following: fingerprint feature information, voiceprint feature information, palmprint feature information, and gesture feature information. The feature information is personalized information set by the user. The gesture feature information refers to a sliding track of the user in any area or a specified area on a touchscreen of the mobile terminal. The fingerprint feature information is obtained by collecting a fingerprint image and abstracting the fingerprint image as data that represents a fingerprint feature. The palmprint feature information is similar to the fingerprint feature information, but it is a palmprint image to be collected. The voiceprint feature information refers to pitch, a loudness, a frequency, and the like of a sound made by the user. The user may autonomously select any one of the fingerprint feature information, the voiceprint feature information, the palmprint feature information, and the gesture feature information, to trigger the radio frequency card function. This improves user experience.

In an embodiment, the method further includes: in response to a radio frequency card association request carrying the radio frequency card type, obtaining the feature information of the user, and establishing the mapping relationship between the feature information and the radio frequency card type. It can be learned that the mapping relationship between the feature information and the radio frequency card type is established, so that the mobile terminal can store the mapping relationship between the feature information and the radio frequency card type, determines the target radio frequency card type corresponding to the feature information of the user that is carried in the feature input event, and invokes the radio frequency card function corresponding to the target radio frequency card type.

In an embodiment, the establishing the mapping relationship between the feature information and the radio frequency card type includes: performing identity authentication on the user, and if an authentication result succeeds, establishing the mapping relationship between the feature information and the radio frequency card type. Because property security of the user is involved when the radio frequency card function is invoked, to avoid causing unnecessary property loss to the user, identity authentication may be performed on the user when "establishing the mapping relationship between the feature information and the radio frequency card type." If the identity authentication succeeds, the mapping relationship between the feature information and the radio frequency card type is established to provide security assurance for the user.

In an embodiment, the performing identity authentication on the user includes: obtaining an unlock password entered by the user; and performing identity authentication on the user based on a determining result whether the unlock password entered by the user is consistent with a preset unlock password. When the unlock password entered by the user is consistent with the preset unlock password, it may be determined that the current user is an authorized user, so that the mapping relationship between the feature information and the radio frequency card type can be established. This provides security assurance for the user.

In an embodiment, the target radio frequency card type corresponds to a plurality of radio frequency cards, and the invoking a radio frequency card function corresponding to the radio frequency card type includes: invoking a radio frequency card function corresponding to a default radio frequency card, where the default radio frequency card is predetermined to be preferentially used in the plurality of radio frequency cards. It can be learned that, in this implementation, the default radio frequency card may be directly selected from the plurality of radio frequency cards for the user, so that the radio frequency card function corresponding to the default radio frequency card is directly invoked.

In an embodiment, the target radio frequency card type corresponds to a plurality of radio frequency cards, and the invoking a radio frequency card function corresponding to the radio frequency card type includes: invoking a radio frequency card function corresponding to a radio frequency card selected by the user from the plurality of radio frequency cards. It can be learned that in this implementation, when there are a plurality of radio frequency cards corresponding to the target radio frequency card type, the user may select, based on a requirement of the user, a radio frequency card that the user wants to use. This effectively improves user experience.

In an embodiment, the determining, based on a mapping relationship between the feature information and a radio frequency card type, a target radio frequency card type corresponding to the feature information of the user; and invoking a radio frequency card function corresponding to the target radio frequency card type includes: if the feature information is further used to invoke a screen unlocking function, determining, preferentially based on the mapping relationship between the feature information and the radio frequency card type, the target radio frequency card type corresponding to the feature information of the user, and invoking the radio frequency card function corresponding to the target radio frequency card type. It can be learned that in this embodiment of this application, a priority of the mapping relationship between the feature information and the radio frequency card type is higher than a priority of a mapping relationship between the feature information and the screen unlocking function. Therefore, after obtaining the feature information of the user from the feature input event obtained through monitoring, the mobile terminal preferentially invokes the radio frequency card function corresponding to the target radio frequency card type corresponding to the feature information of the user.

According to a second aspect of an embodiment of this application, an apparatus for invoking a radio frequency card function is provided. The apparatus includes:

a monitoring unit, configured to monitor a feature input event, and obtain feature information of a user from the feature input event obtained through monitoring; a determining unit, configured to determine, based on a mapping relationship between the feature information and a radio frequency card type, a target radio frequency card type corresponding to the feature information of the user; and an invoking unit, configured to invoke a radio frequency card function corresponding to the target radio frequency card type.

In an embodiment, the feature information includes at least one of the following: fingerprint feature information, voiceprint feature information, palmprint feature information, and gesture feature information.

In an embodiment, the apparatus further includes an obtaining unit, configured to, in response to a radio frequency card association request carrying the radio frequency card type, obtain the feature information of the user, and establish the mapping relationship between the feature information and the radio frequency card type.

In an embodiment, in establishing the mapping relationship between the feature information and the radio frequency card type, the obtaining unit is to perform identity authentication on the user, and if an authentication result succeeds, establish the mapping relationship between the feature information and the radio frequency card type.

In an embodiment, the performing identity authentication on the user includes: obtaining an unlock password entered by the user; and performing identity authentication on the user based on a determining result whether the unlock password entered by the user is consistent with a preset unlock password.

In an embodiment, the target radio frequency card type corresponds to a plurality of radio frequency cards, and the invoking unit is specifically configured to: invoke a radio frequency card function corresponding to a default radio frequency card, where the default radio frequency card is predetermined to be preferentially used in the plurality of radio frequency cards.

In an embodiment, the target radio frequency card type corresponds to a plurality of radio frequency cards, and the invoking unit is specifically configured to: invoke a radio frequency card function corresponding to a radio frequency card selected by the user from the plurality of radio frequency cards.

In an embodiment, in determining, based on a mapping relationship between the feature information and a radio frequency card type, a target radio frequency card type corresponding to the feature information of the user; and invoking a radio frequency card function corresponding to the target radio frequency card type includes, if the feature information is further used to invoke a screen unlocking function, the determining unit is to determine, preferentially based on the mapping relationship between the feature information and the radio frequency card type, the target radio frequency card type corresponding to the feature information of the user, and invoke the radio frequency card function corresponding to the target radio frequency card type.

According to a third aspect of an embodiment of this application, a device for invoking a radio frequency card function is provided. The device includes:

a processor and a memory, where the memory is configured to store an instruction; and the processor is configured to execute the instruction in the memory, to perform the method according to any one of the first aspect or the possible implementations of the first aspect.

According to a fourth aspect of an embodiment of this application, a computer-readable storage medium is provided, including an instruction. When the instruction is run on a computer, the computer is enabled to perform the method according to any one of the first aspect or the possible implementations of the first aspect.

According to a fifth aspect of an embodiment of this application, a computer program product including an instruction is provided. When the computer program product runs on a computer, the computer is enabled to perform the method according to any one of the first aspect or the possible implementations of the first aspect.

It can be learned from the foregoing technical solutions that the embodiments of this application have the following advantages:

In the embodiments of this application, the user may preset the mapping relationship between the feature information and the radio frequency card type in the mobile terminal. The mobile terminal may monitor the feature input event, obtain the feature information of the user from the feature input event, determine, based on the mapping relationship between the feature information and the radio frequency card type, the target radio frequency card type corresponding to the feature information of the user, and invoke the radio frequency card function corresponding to the target radio frequency card type. In other words, in the embodiments of this application, different radio frequency card types may be distinguished based on the feature information of the user, so that the radio frequency card function corresponding to the target radio frequency card type corresponding to the feature information of the user can be invoked based on the feature information of the user. This further improves a card swiping success rate and improves user experience.

DESCRIPTION OF EMBODIMENTS

Figure 1:
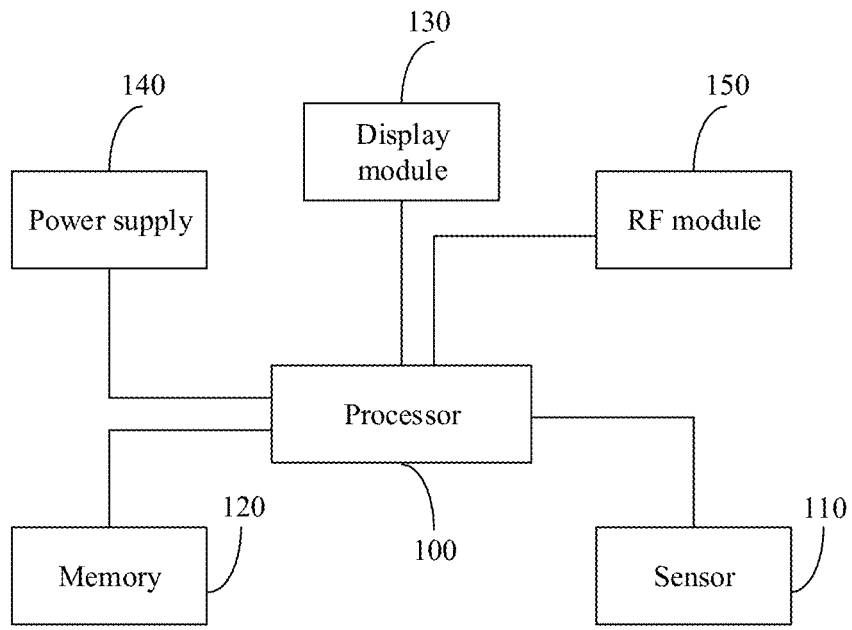
FIG. 1 is a hardware circuit diagram of a mobile terminal according to an embodiment of this application.

Embodiments of this application provide a card swiping method and apparatus, to improve a card swiping success rate and user experience.

In the specification, claims, and accompanying drawings of the present invention, the terms "first", "second", "third", "fourth", and so on (if existent) are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain" and any other variants mean to cover the non-exclusive inclusion, for example, a process, method, system, product, or device that includes a list of operations or units is not necessarily limited to those units, but may include other units not expressly listed or inherent to such a process, method, system, product, or device.

When functions of a plurality of types of radio frequency cards are integrated into one mobile terminal, because different types of radio frequency cards correspond to different radio frequency transmit devices, when a radio frequency card that does not correspond to a type of radio frequency transmit device is used for card swiping, a card swiping failure problem occurs. In this case, a conventional processing manner is: A user selects one of the plurality of radio frequency cards as a default card, and preferentially uses the default card for each time of card swiping. When the radio frequency transmit device corresponds to the default card, card swiping succeeds. When the radio frequency transmit device does not correspond to the default card, card swiping fails.

For example, in an application scenario, the radio frequency cards integrated into the mobile terminal include a bus card and a bank card. The bus card is swiped on a bus baffle gate or a subway baffle gate, and the bank card is swiped on a POS machine. If the bus card is swiped on the POS machine, the card swiping fails. If the bank card is swiped on the bus baffle gate, the card swiping also fails. If the user sets the bus card as the default card, when the radio frequency transmit device is the bus baffle gate or the subway baffle gate, card swiping succeeds. However, when the radio frequency transmit device is the POS machine, card swiping fails. This affects user experience.

To resolve the foregoing problem, an embodiment of this application provides a method for invoking a radio frequency card function. The method may be applied to a mobile terminal, to improve a card swiping success rate and user experience. The mobile terminal in the embodiments of this application includes but is not limited to a device such as a mobile phone supporting the radio frequency card function or a tablet computer supporting the radio frequency card function. In this embodiment of this application, an example in which the mobile terminal is a mobile phone is used for description.

FIG. 1 is a hardware circuit diagram of a mobile terminal according to an embodiment of this application.

The mobile terminal includes a processor 100, a sensor 110, a memory 120, a display module 130, a power supply 140, and a radio frequency (Radio Frequency, RF) module 150.

The RF module 150 may be configured to receive and send a signal. In particular, the RF module may receive a signal sent by a radio frequency transmit device such as a POS machine or a bus baffle gate, sends the received signal to the processor 110 for processing, and sends data processed by the processor 110 to the radio frequency transmit device, to implement interaction with the radio frequency transmit device. Generally, the RF module includes but is not limited to an antenna, at least one amplifier, a transceiver, a coupler, a low noise amplifier (LNA), a duplexer, and the like.

The memory 120 may be configured to store a software program and a software program module. The processor 100 executes various functional applications and data processing by running the software program and the software program module that are stored in the memory 120. The memory 120 may mainly include a program storage area, a data storage area, and a secure storage unit. The program storage area may store an operating system, an application program required by at least one function (such as a sound playing function and an image playing function), and the like. The data storage area may store data (such as audio data and a phone book) created in a use process of the mobile terminal, and the like. The secure storage unit is configured to store sensitive information, for example, may include radio frequency card information such as a bank card number and a bus card amount.

The display unit 130 may be configured to display a menu or a screen, to instruct a user to: enter feature information of the user, and set a mapping relationship between the feature information of the user and a radio frequency card type on the terminal device, and the like. The mapping relationship between the feature information and the radio frequency card type may be stored in the memory 120.

The mobile terminal may include at least one sensor 110, for example, a fingerprint sensor. The fingerprint sensor may collect a fingerprint of the user and stores the fingerprint in the memory 120 of the mobile terminal.

The processor 100 is a control center of the mobile terminal, is connected to various parts of the mobile terminal by using various interfaces and lines, and executes various functions of the mobile terminal and processes data by running or executing the software program and/or the software program module stored in the memory 120 and invoking data stored in the memory 120, to implement various services based on the mobile terminal. An application processor mainly processes the operating system, a user screen, the application program, and the like.

The mobile terminal further includes the power supply 140 (for example, a battery) that supplies power to each component. In an embodiment, the power supply may be logically connected to the processor 100 by using a power management system, to implement functions such as charging, discharging, and power consumption management by using the power management system.

Although not shown in FIG. 1, the mobile terminal may further include modules such as a camera and a Bluetooth module. Details are not described herein.

The following briefly describes, with reference to the hardware circuit diagram of the mobile terminal in FIG. 1, the method for invoking a radio frequency card function provided in this embodiment of this application.

A user may put a finger in a fingerprint collection area of the mobile terminal. The fingerprint collection area of the mobile terminal includes a fingerprint sensor. After detecting fingerprint feature information of the user, the fingerprint sensor sends the fingerprint feature information to the processor 100. The processor 100 queries a fingerprint feature information function. In an embodiment, the processor 100 may read the mapping relationship between the feature information and the radio frequency card type in the memory 120, to determine, based on the mapping relationship between the feature information and the radio frequency card type, a target radio frequency card type corresponding to the fingerprint feature information. After determining the target radio frequency card type, the processor 100 may invoke a radio frequency card function corresponding to the target radio frequency card type. In an embodiment, the processor 100 may read radio frequency card information corresponding to the target radio frequency card type from the memory 120, and may set a parameter of a hardware circuit of the RF module 150 based on the radio frequency card information, in other words, the mobile terminal is regarded as a radio frequency card corresponding to the target radio frequency card type, to interact with a radio frequency transmit device corresponding to the radio frequency card type. Correspondingly, the display unit 130 may display related information about the invoked radio frequency card function, to prompt the user of the currently invoked radio frequency card function.

Figure 2:
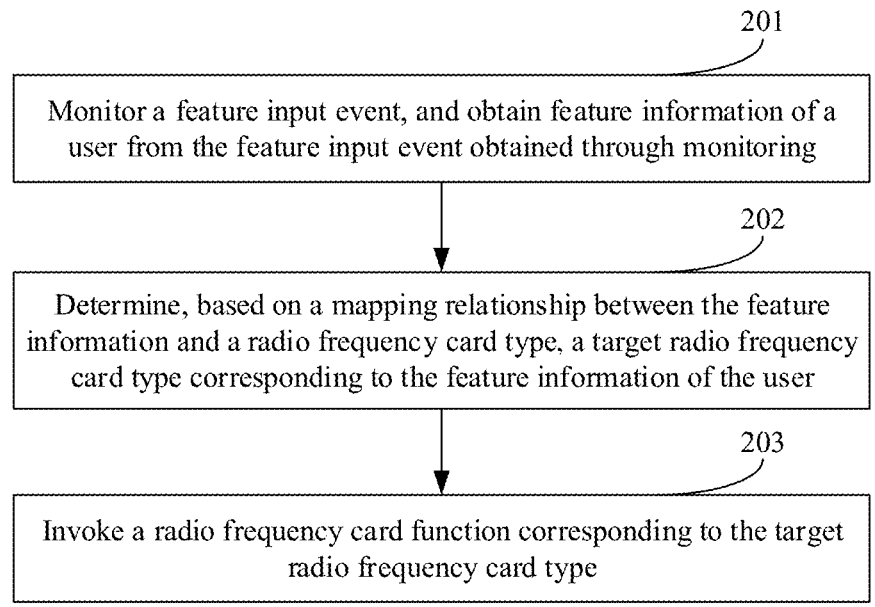
FIG. 2 is a schematic flowchart of a method for invoking a radio frequency card function according to an embodiment of this application.

FIG. 2 is a schematic flowchart of a method for invoking a radio frequency card function according to an embodiment of this application. The following describes in detail the method for invoking the radio frequency card function provided in this embodiment of this application.

The method for invoking the radio frequency card function provided in this embodiment of this application may be applied to a mobile terminal, and the method includes the following operations 201 to 203.

Operation 201: Monitor a feature input event, and obtain feature information of a user from the feature input event obtained through monitoring.

The feature input event in this embodiment of this application is an event of inputting the feature information of the user. It may be understood that the feature input event may carry the feature information of the user, so that the feature information of the user may be obtained from the feature input event obtained through monitoring. For example, the feature input event may be that the user places a finger of the user in a fingerprint collection area of the mobile terminal. After detecting the feature input event, the mobile terminal may obtain fingerprint feature information of the user. For another example, the feature input event may be that the user records a segment of sound by using a microphone. After detecting the feature input event, the mobile terminal may obtain voiceprint feature information of the user based on the sound.

In an embodiment of this application, the mobile terminal may monitor the feature input event. There are a plurality of manners of monitoring the feature input event by the mobile terminal. A manner of monitoring the feature input event varies based on a type of the feature input event.

For example, the feature input event is that the user places a finger of the user in the fingerprint collection area of the mobile terminal. The mobile terminal monitors the feature input event, and may collect, by using a fingerprint collection module of the mobile terminal, the fingerprint of the user placed in the fingerprint collection area of the mobile terminal. For example, the feature input event is that the user records a segment of sound. The mobile terminal monitors the feature input event, and may obtain the sound of the user by using a microphone.

It should be noted that, in an embodiment of this application, a specific scenario in which the mobile terminal monitors the feature input event is not specifically limited. The mobile terminal may monitor the feature input event in a screen-locked state and a blank screen state, or may monitor the feature input event in a non-lock screen state.

In an embodiment of this application, the feature information is personalized information set by the user.

Specifically, the feature information may include one or more of the fingerprint feature information of the user, the voiceprint feature information of the user, palmprint feature information of the user, gesture feature information, and the like. The gesture feature information refers to a sliding track of the user in any area or a specified area on a touchscreen of the mobile terminal. The fingerprint feature information is obtained by collecting a fingerprint image and abstracting the fingerprint image as data that represents a fingerprint feature. The palmprint feature information is similar to the fingerprint feature information, but it is a palmprint image to be collected. The voiceprint feature information refers to pitch, a loudness, a frequency, and the like of a sound made by the user. For example, voiceprint feature information of the "bank card" and voiceprint feature information of the "bus card" are different.

Operation 202: Determine, based on a mapping relationship between the feature information and a radio frequency card type, a target radio frequency card type corresponding to the feature information of the user.

It should be noted that the radio frequency card type in this embodiment of this application includes but is not limited to a bus card type, a bank card type, and an access control card type, and the radio frequency card type may alternatively be another type.

It should be noted that, in this embodiment of this application, the mobile terminal pre-stores the mapping relationship between the feature information and the radio frequency card type, so that after obtaining the feature information of the user, the mobile terminal may determine, based on the pre-stored mapping relationship between the feature information and the radio frequency card type, the target radio frequency card type corresponding to the feature information of the user. In an example, the following Table 1 lists the mapping relationship between the feature information and the radio frequency card type.

TABLE 1

| Feature information | Radio frequency card type |
| --- | --- |
| Fingerprint feature information of a right index finger | Bus card |
| Fingerprint feature information of a right thumb | Bank card |
| Fingerprint feature information of a left thumb | Access control card |

It can be learned from the Table 1 that the mobile terminal pre-stores a mapping relationship between the fingerprint feature information of the right index finger and the bus card type, a mapping relationship between the fingerprint feature information of the right thumb and the bank card type, and a mapping relationship between the fingerprint feature information of the left thumb and the access control card type. Therefore, if the feature input event obtained through monitoring includes the fingerprint feature information of the right index finger of the user, it may be determined that the target radio frequency card type is the bus card type. If the feature input event obtained through monitoring includes the fingerprint feature information of the right thumb of the user, it may be determined that the target radio frequency card type is the bank card type. If the feature input event obtained through monitoring includes the fingerprint feature information of the left thumb of the user, it may be determined that the target radio frequency card type is the access control card type.

It should be further noted that the Table 1 shows an example in which the mobile terminal stores a plurality of mapping relationships between the feature information and the radio frequency card types. In an embodiment, the mobile terminal may store only one mapping relationship between the feature information and the radio frequency card type. This is not limited in this application.

Operation 203: Invoke a radio frequency card function corresponding to the target radio frequency card type.

After operation 202 is performed, the radio frequency card function corresponding to the target radio frequency card type may be invoked based on the target radio frequency card type determined in operation 202.

For operation 203, it should be noted that, as described above, the mobile terminal in this embodiment of this application has the radio frequency card function, and the radio frequency card function may be implemented by using a corresponding hardware circuit of the mobile terminal. In an embodiment, different types of radio frequency card functions may be implemented by setting a parameter of a hardware circuit of the RF module 150 of the mobile terminal. For example, a bus card function and a bank card function are implemented. Therefore, after the target radio frequency card type is determined in operation 202, the mobile terminal sets a parameter of a corresponding hardware circuit of the mobile terminal, to implement the radio frequency card function corresponding to the target radio frequency card type, so that a corresponding radio frequency transmit device interacts with the hardware circuit corresponding to the target radio frequency card type.

In an embodiment of this application, the user may preset the mapping relationship between the feature information and the radio frequency card type in the mobile terminal. The mobile terminal may monitor the feature input event, obtain the feature information of the user from the feature input event, determine, based on the mapping relationship between the feature information and the radio frequency card type, the target radio frequency card type corresponding to the feature information of the user, and invoke the radio frequency card function corresponding to the target radio frequency card type. In other words, in this embodiment of this application, different radio frequency card types may be distinguished based on the feature information of the user, so that the radio frequency card function corresponding to the target radio frequency card type corresponding to the feature information of the user can be invoked based on the feature information of the user. This further improves a card swiping success rate and improves user experience.

In an embodiment, the target radio frequency card type may correspond to a plurality of radio frequency cards. For example, the target radio frequency card type is the bank card type, and the bank card type may correspond to three radio frequency cards: an Industrial and Commercial Bank of China debit card, a Bank of Communications debit card, and a China Construction Bank debit card. However, when the user invokes the radio frequency card function, the user wants to invoke a card swiping function of one radio frequency card.

In an embodiment of this application, during specific implementation of operation 203, a radio frequency card function corresponding to a default radio frequency card may be invoked. The default radio frequency card is predetermined to be preferentially used in the plurality of radio frequency cards.

A specific implementation of predetermining a radio frequency card that is preferentially used is not limited in this embodiment of this application.

In an embodiment, the mobile terminal may automatically select, based on a time sequence of adding the radio frequency card function by the user, a radio frequency card that is added earliest or latest as the default radio frequency card. For example, the bank card type corresponds to three bank cards, and the three bank cards are respectively an Industrial and Commercial Bank of China bank card, a Bank of Communications bank card, and a China Construction Bank bank card in ascending order of time when the user adds three bank card functions. The Industrial and Commercial Bank of China bank card is an identifier of a bank card that is added earliest. If it is considered that the user may be more accustomed to using the bank card for consumption, the mobile terminal may select the identifier of the Industrial and Commercial Bank of China bank card as an identifier of the default radio frequency card. The China Construction Bank bank card is an identifier of a bank card that is added latest. If it is considered that the user may want to use the recently added bank card for consumption, the mobile terminal may select the China Construction Bank bank card as the default radio frequency card.

In another embodiment, the mobile terminal may select, based on frequent that a radio frequency card function is invoked, a radio frequency card that is most frequently invoked as the default radio frequency card corresponding to the radio frequency card type. For example, the bank card type corresponds to three bank cards: an Industrial and Commercial Bank of China bank card, a Bank of Communications bank card, and a China Construction Bank bank card. A radio frequency card function corresponding to the Industrial and Commercial Bank of China bank card is most frequently invoked, so that the Industrial and Commercial Bank of China bank card is used as the default radio frequency card.

Because the user may want to invoke different radio frequency card functions in different consumption occasions, in this embodiment of this application, in addition to a solution in which the mobile terminal may actively determine an invoked radio frequency card function, the invoked radio frequency card function may be further determined by participation of the user.

Therefore, in an embodiment of this application, during specific implementation of operation 203, the mobile terminal may invoke a radio frequency card function corresponding to the radio frequency card selected by the user from the plurality of radio frequency cards.

In an embodiment, if the target radio frequency card type corresponds to a plurality of radio frequency cards, the mobile terminal displays, to the user, all the plurality of radio frequency cards corresponding to the target radio frequency card type, so that the user selects one of the radio frequency cards. The mobile terminal invokes a radio frequency card function corresponding to the radio frequency card selected by the user as an identifier of a target radio frequency card.

Figure 3:
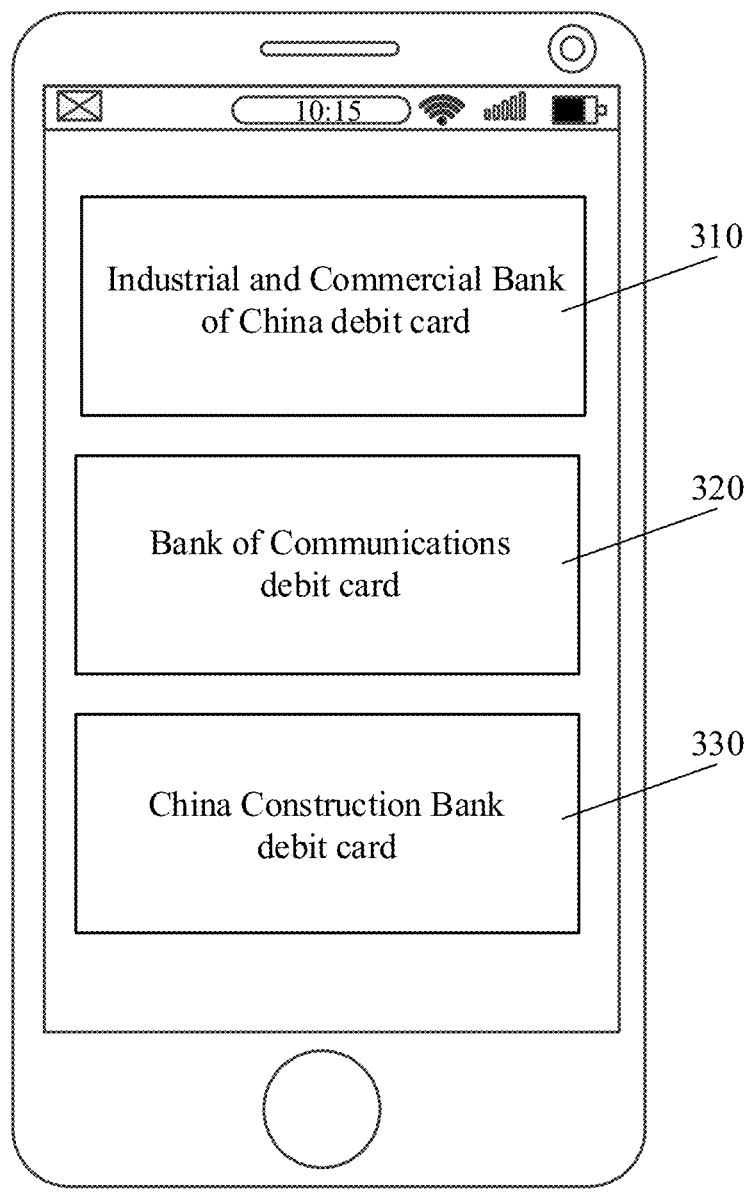
FIG. 3 is a schematic diagram of a screen of displaying, by using a mobile terminal, a plurality of radio frequency card identifiers corresponding to a target radio frequency card according to an embodiment of this application.

It should be noted that a representation form in which the plurality of radio frequency cards corresponding to the target radio frequency card type are displayed to the user is not specifically limited in this embodiment of this application. For example, description may be made with reference to FIG. 3, and the target radio frequency card type corresponds to the Industrial and Commercial Bank of China bank card, the Bank of Communications bank card, and the China Construction Bank bank card. The mobile terminal displays a card type 310 of the Industrial and Commercial Bank of China bank card, a card type 320 of the Bank of Communications bank card, and a card type 330 of the China Construction Bank bank card on a display screen of the mobile terminal. The user may select, by tapping the card type, a radio frequency card function that the user wants to invoke.

It can be learned that in the latter implementation, when there are a plurality of radio frequency cards corresponding to the target radio frequency card type, the user may select, based on a requirement of the user, a radio frequency card that the user wants to use. This effectively improves user experience.

In an embodiment, one piece of feature information may be set for a plurality of purposes, for example, a card swiping function and a screen unlocking function. Therefore, one piece of feature information may correspond to a plurality of mapping relationships, for example, a mapping relationship between feature information and a radio frequency card type, and a mapping relationship between feature information and a screen unlocking function. The mapping relationship between the feature information and the screen unlocking function may be used to invoke the screen unlocking function.

In an embodiment of this application, if the feature information is further used to invoke the screen unlocking function, the target radio frequency card type corresponding to the feature information of the user is determined preferentially based on the mapping relationship between the feature information and the radio frequency card type, and the radio frequency card function corresponding to the target radio frequency card type is invoked.

In other words, in an embodiment of this application, a priority of the mapping relationship between the feature information and the radio frequency card type is higher than a priority of the mapping relationship between the feature information and the screen unlocking function. Therefore, after obtaining the feature information of the user from the feature input event obtained through monitoring, the mobile terminal preferentially invokes the radio frequency card function corresponding to the target radio frequency card type corresponding to the feature information of the user.

As described above, the mobile terminal pre-stores the mapping relationship between the feature information and the radio frequency card type. The method for invoking the radio frequency card function provided in this embodiment of this application may further include establishing the mapping relationship between the feature information and the radio frequency card type, so that the mobile terminal can store the mapping relationship between the feature information and the radio frequency card type.

In an example, the user may set the mapping relationship between the feature information and the radio frequency card type by using an application program installed on the mobile terminal. Specifically, the application program, in response to a radio frequency card association request carrying the radio frequency card type, obtains the feature information of the user, and establishes the mapping relationship between the feature information of the user and the radio frequency card type.

It should be noted that the radio frequency card association request in this embodiment of this application is used to request to set the mapping relationship between the feature information and the radio frequency card type. The radio frequency card association request may be triggered by the user.

Figure 4A:
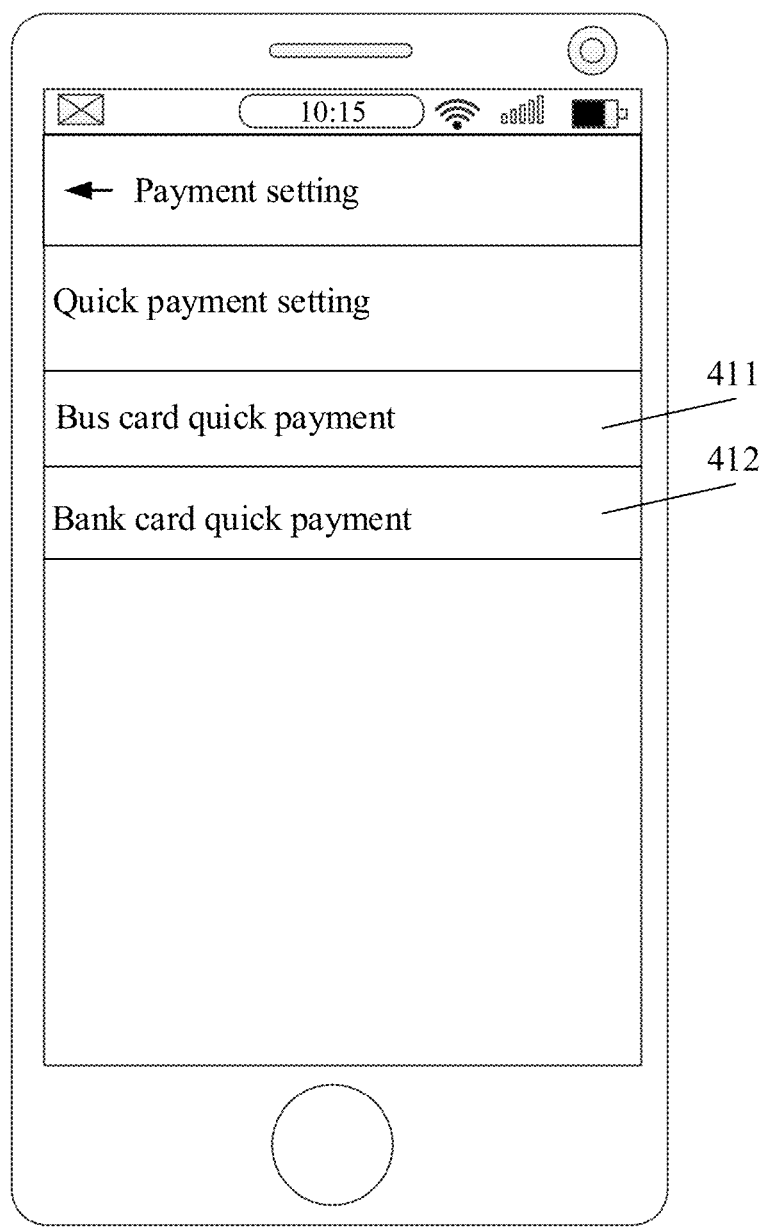
FIG. 4(a) is a schematic diagram of a screen of setting, by a user, a mapping relationship between feature information and a radio frequency card type in a "wallet" application according to an embodiment of this application.
Figure 4B:
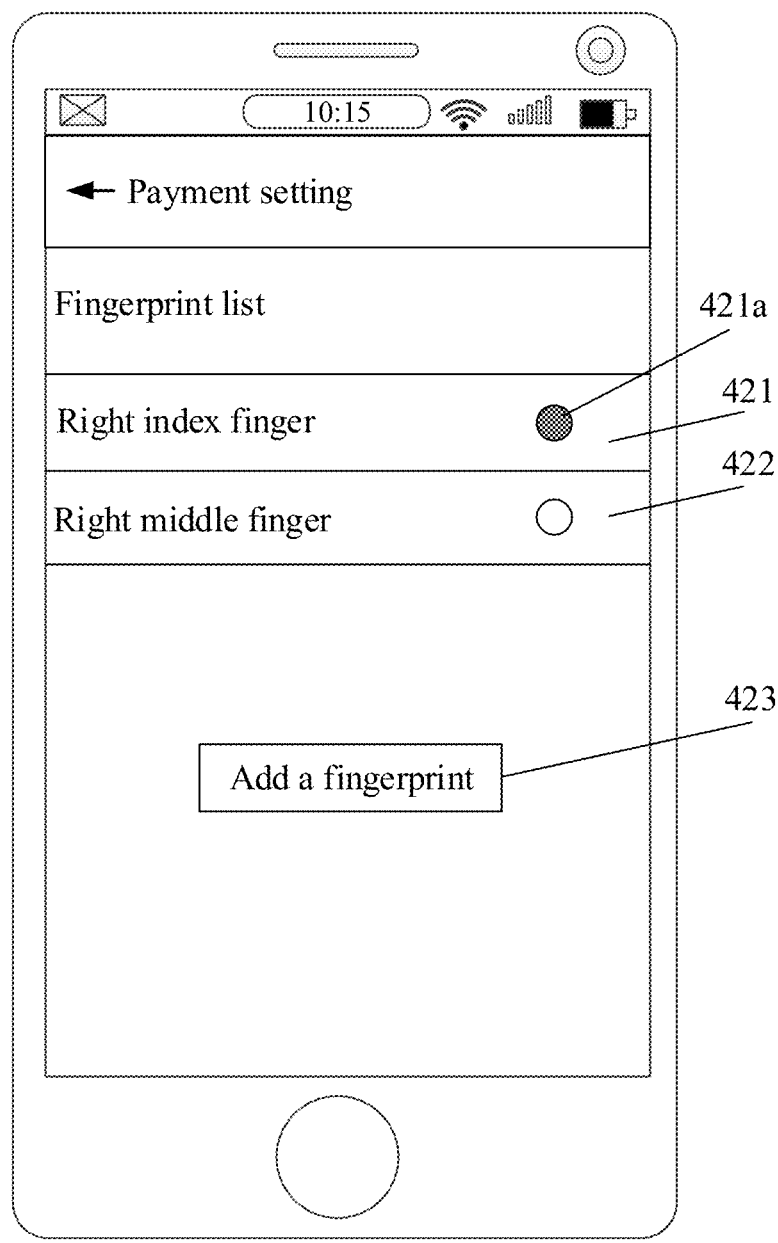
FIG. 4(b) is another schematic diagram of a screen of setting, by a user, a mapping relationship between feature information and a radio frequency card type in a "wallet" application according to an embodiment of this application.

For example, description may be made with reference to FIG. 4(a) and FIG. 4(b). FIG. 4(a) is a schematic diagram of a screen of setting, by a user, a mapping relationship between feature information and a radio frequency card type in a "wallet" application program. The feature information in FIG. 4(a) is fingerprint feature information. When the user taps a button "Bus card quick payment" 411 or "Bank card quick payment" 412, a radio frequency card association request is triggered. If the user taps the button "Bus card quick payment" 411, the radio frequency card association request carries a bus card type. If the user taps the button "Bank card quick payment" 412, the radio frequency card association request carries a bank card type.

An example in which the user sets the mapping relationship between the bus card type and the fingerprint feature information is used for description. First, the user taps the button "Bus card quick payment" 411 on a screen shown in FIG. 4(a), to trigger the radio frequency card association request, where the radio frequency card association request carries the bus card type. Then, the display screen displays a screen shown in FIG. 4(b), to display a fingerprint list in FIG. 4(b). In an implementation, the user may select an entry from the fingerprint list displayed on the screen shown in FIG. 4(b), and the mobile terminal obtains fingerprint feature information of the entry, and further establishes a mapping relationship between the fingerprint feature information of the entry and the bus card type. For example, if the user taps a "Right index finger" 421 in the fingerprint list displayed in FIG. 4(b), a hollow circle 421a behind the "Right index finger" is filled with a shadow, to indicate that the user sets a mapping relationship between fingerprint feature information of the "Right index finger" and the bus card type. In another implementation, the user may alternatively tap a button "Add a fingerprint" 423 in FIG. 4(b), to record new fingerprint feature information that is not in the list, and establishes a mapping relationship between the newly recorded fingerprint feature information and the radio frequency card type.

In another example, the user may further set the mapping relationship between the feature information and the radio frequency card type by using a system setting of the mobile terminal. Specifically, in response to a user feature information association request that carries feature information of the user, the system setting obtains the radio frequency card type, and establishes the mapping relationship between the feature information of the user and the radio frequency card type.

The user feature information association request in this embodiment of this application is used to request to set the mapping relationship between the feature information of the user and the radio frequency card type. The user feature information association request may be triggered by the user.

Figure 5A:
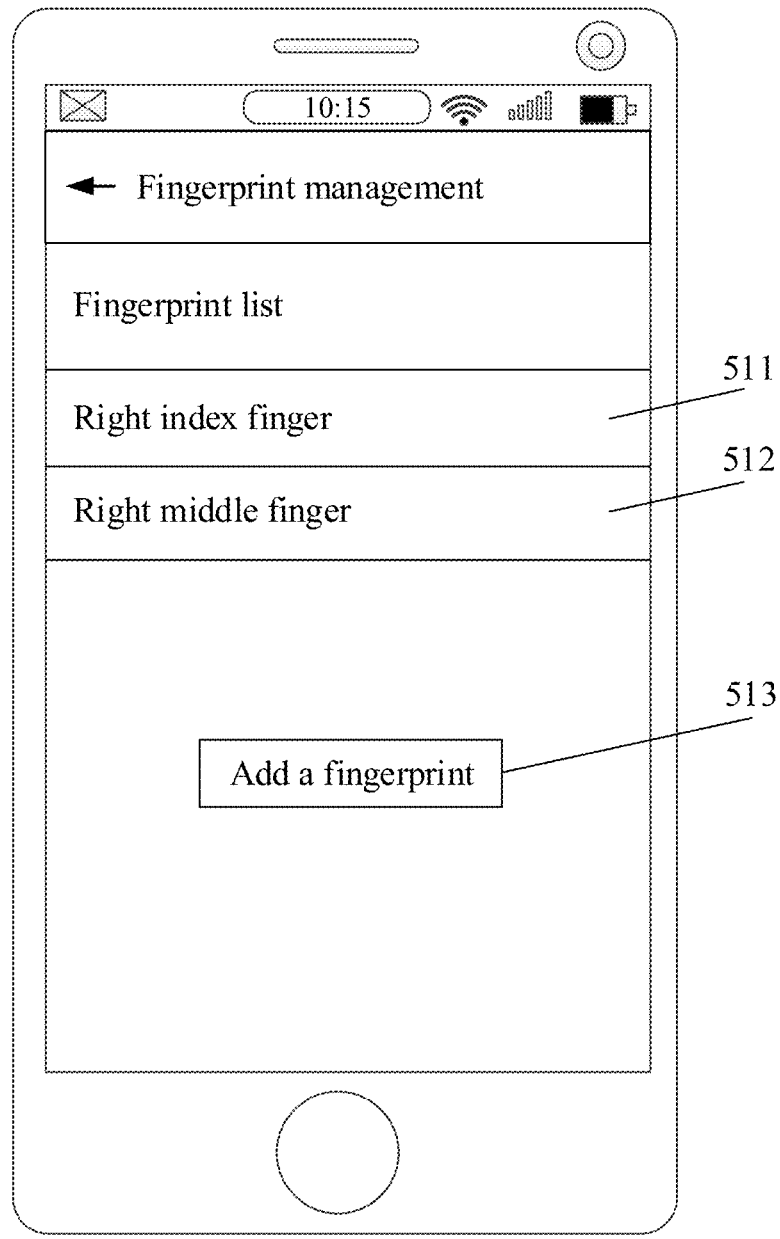
FIG. 5(a) is a schematic diagram of a screen of setting, by a user, a mapping relationship between feature information and a radio frequency card type in a system according to an embodiment of this application.
Figure 5B:
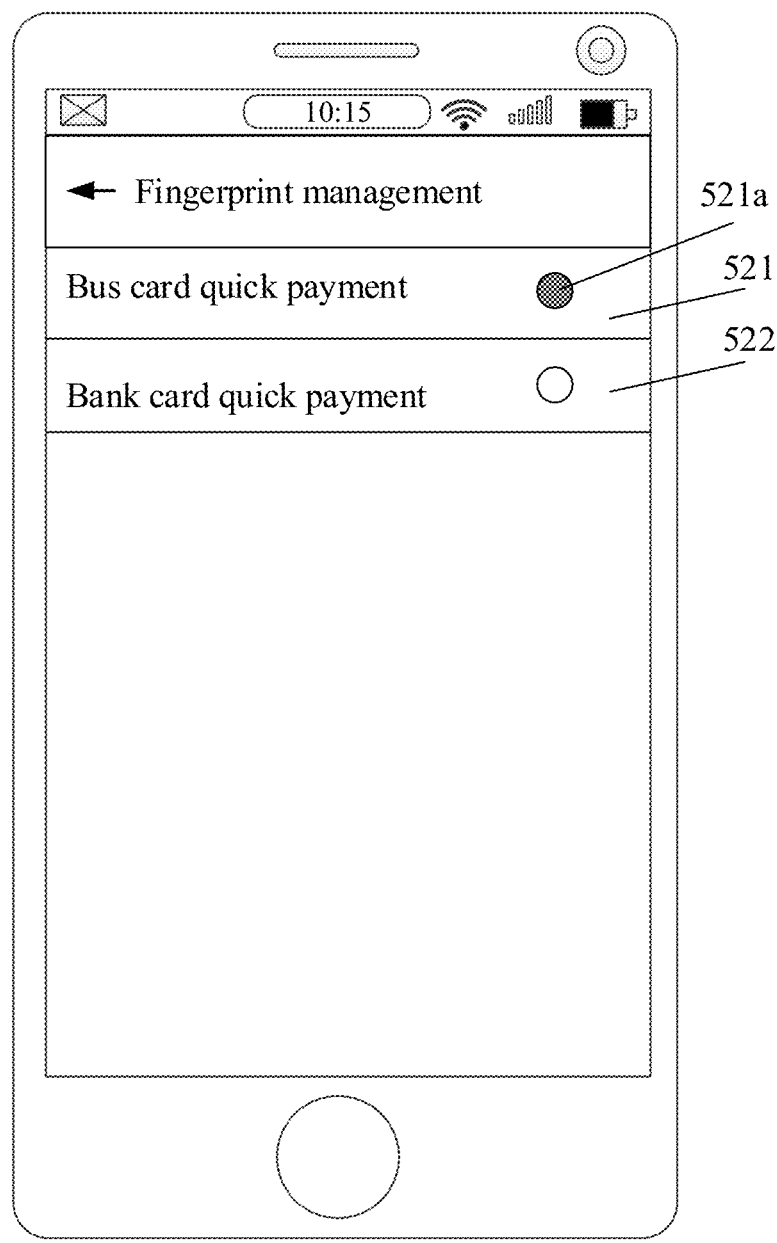
FIG. 5(b) is another schematic diagram of a screen of setting, by a user, a mapping relationship between feature information and a radio frequency card type in a system according to an embodiment of this application.

For example, description may be made with reference to FIG. 5(a) and FIG. 5(b). FIG. 5(a) shows a list of fingerprint feature information that has been recorded in a current system. In a possible embodiment, a user may tap fingerprint feature information in the fingerprint list, to trigger a user feature information association request, and to establish a mapping relationship between the fingerprint feature information and a radio frequency card type. For example, the user taps a button "Right index finger" 511 in FIG. 5(a), to trigger a user feature information association request, where the request carries fingerprint feature information of the "Right index finger". A display screen displays an operation screen in FIG. 5(b). The user may select a radio frequency card type on the screen shown in FIG. 5(b). For example, the user selects "Bus card quick payment" 521, and the mobile terminal obtains the bus card type, and establishes a mapping relationship between the fingerprint feature information of the "Right index finger" and the bus card type. On the operation screen in FIG. 5(b), a hollow circle 521 behind the "Bus card quick payment" is filled with a shadow, to indicate that the user sets the mapping relationship between the fingerprint feature information of the "Right index finger" and the bus card type. In another possible implementation, the user may alternatively tap a button "Add a fingerprint" 513 in FIG. 5(a), to record fingerprint feature information that is not in the list, and establishes a mapping relationship between the newly recorded fingerprint feature information and the radio frequency card type. It may be understood that a manner of setting the mapping relationship between the feature information and the radio frequency card type does not constitute a limitation on this embodiment of this application.

In an embodiment of this application, because property security of the user is involved when the radio frequency card function is invoked, to avoid causing unnecessary property loss to the user, identity authentication may be performed on the user when "establishing the mapping relationship between the feature information and the radio frequency card type." If the identity authentication succeeds, the mapping relationship between the feature information and the radio frequency card type is established.

In an embodiment, identity authentication is performed on the user in a plurality of authentication manners. In a possible implementation, the user may be prompted to enter an unlock password. The mobile terminal obtains the unlock password entered by the user, and determines whether the unlock password entered by the user is consistent with a preset unlock password. If the unlock password entered by the user is consistent with the preset unlock password, the authentication succeeds.

It should be noted that a representation form of the unlock password is not specifically limited in this embodiment of this application. The unlock password may be a digital password, a graphic password, or a password in another form. In addition, the unlock password may be a screen unlock password of the mobile terminal, and the unlock password may also be a preset authentication password for establishing the mapping relationship between the feature information and the radio frequency card type.

It may be understood that when the unlock password entered by the user is consistent with the preset unlock password, it may be determined that the current user is an authorized user, so that the mapping relationship between the feature information and the radio frequency card type can be established.

Figure 6:
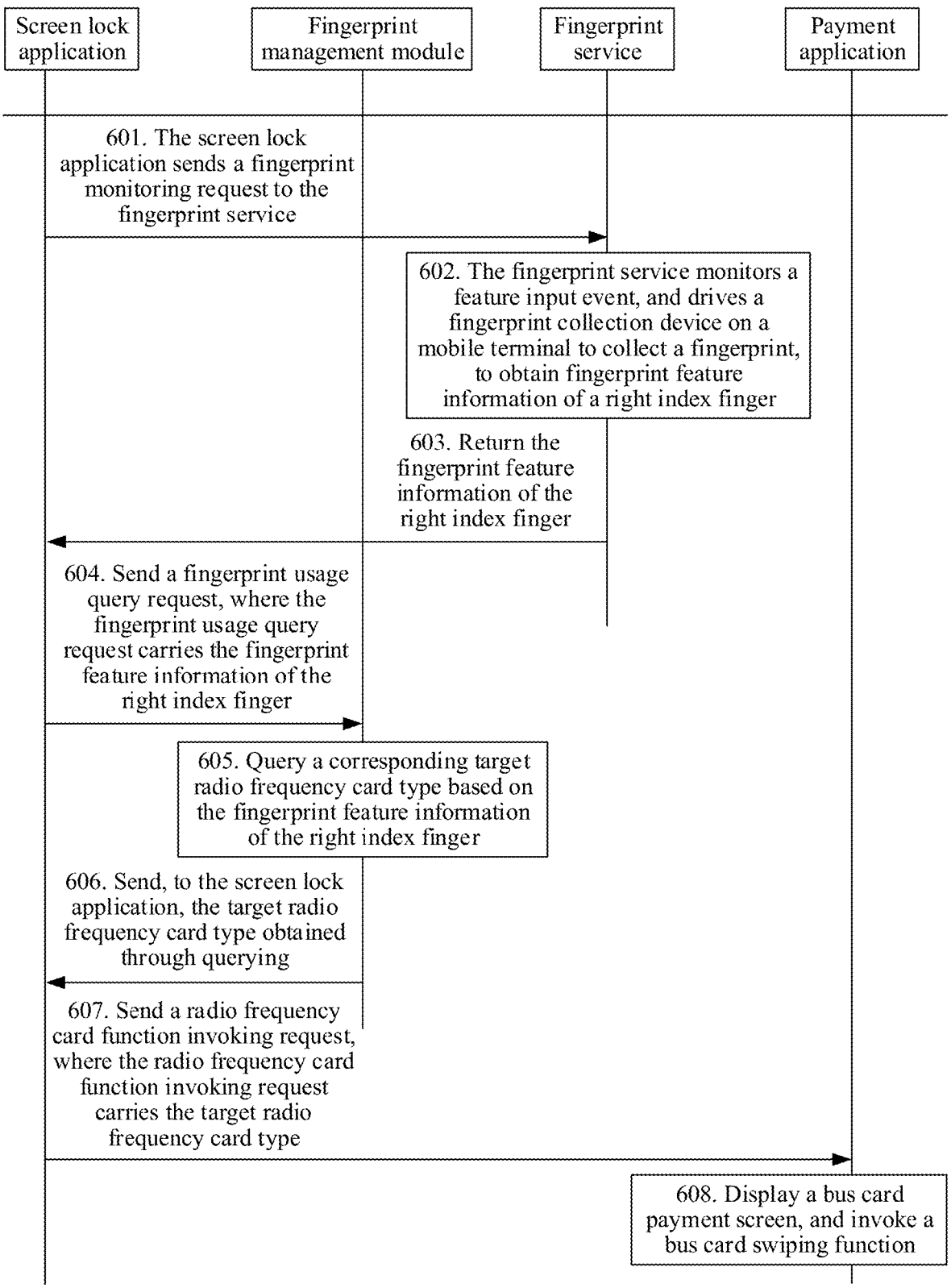
FIG. 6 is a schematic diagram of an application scenario of a method for invoking a radio frequency card function according to an embodiment of this application.

The foregoing content describes the card swiping method provided in the embodiments of this application. The following provides description with reference to FIG. 6. FIG. 6 is a schematic diagram of an application scenario according to an embodiment of this application. In this scenario, a user presets a mapping relationship between a fingerprint of a right index finger and a bus card type. In other words, a mobile terminal pre-stores the mapping relationship between the fingerprint feature information of the right index finger of the user and the bus card type. The mobile terminal monitors, by using a screen lock application, a feature input event in a screen-locked state, in other words, monitors whether the user enters fingerprint feature information into the mobile terminal, and invokes a corresponding radio frequency card function based on the fingerprint feature information. The following describes an application scenario in this embodiment of this application.

601. A screen lock application sends a fingerprint monitoring request to a fingerprint service.

The screen lock application is an application program that is used to unlock a screen on a mobile terminal. The application program may be in a running state when the mobile terminal is locked, so that the screen lock application may send the fingerprint monitoring request to the fingerprint service when the mobile terminal is in a screen-locked state.

The fingerprint monitoring request is used to request to monitor whether there is a feature input event, in other words, to monitor whether a user places a right index finger in a fingerprint collection area of the mobile terminal.

602. The fingerprint service monitors the feature input event, and drives a fingerprint collection device on the mobile terminal to collect a fingerprint, to obtain fingerprint feature information of the right index finger.

603. The fingerprint service returns the fingerprint feature information of the right index finger to the screen lock application.

604. The screen lock application sends a fingerprint usage query request to a fingerprint management module, where the fingerprint usage query request carries the fingerprint feature information of the right index finger.

605. The fingerprint management module queries a corresponding target radio frequency card type based on the fingerprint feature information of the right index finger.

606. The fingerprint management module sends, to the screen lock application, the target radio frequency card type obtained through querying.

In an application scenario of this embodiment of this application, a mapping relationship between the fingerprint feature information of the right index finger of the user and a bus card type is stored on the fingerprint management module of the mobile terminal. In addition to storing the mapping relationship, the fingerprint management module may further store other information. For example, the fingerprint management module may further store a screen unlocking mapping relationship between fingerprint feature information and a screen unlocking function. This is not specifically limited in this embodiment of this application. Therefore, after obtaining the fingerprint feature information of the right index finger, the screen lock application sends the usage query request to the fingerprint management module. The fingerprint management module determines, based on a pre-stored mapping relationship between the fingerprint feature information of the right index finger of the user and the bus card type, the target radio frequency card type corresponding to the fingerprint feature information of the right index finger, and sends the target radio frequency card type to the screen lock application.

607. The screen lock application sends a radio frequency card function invoking request to a payment application, where the radio frequency card function invoking request carries the target radio frequency card type.

608: The payment application displays a bus card payment screen, and invokes a bus card swiping function.

The payment application in this embodiment of this application may be an application program having a payment function on the mobile terminal. For example, the payment application may be a "Huawei wallet application" or a "Xiaomi payment application". The payment application is not limited in this embodiment of this application.

After receiving this payment request, the payment application determines, based on the target radio frequency card type in the payment request, that the target radio frequency card type is the bus card type, to display the bus card payment screen.

In another application scenario of this application, the user presets an action that a fingerprint of the right index finger is used to trigger screen unlocking, and a function that the fingerprint of the right index finger is used to trigger bus card payment. In other words, the mobile terminal pre-stores a screen unlocking mapping relationship between the fingerprint feature information of the right index finger of the user and the screen unlocking function, and a mapping relationship between the fingerprint feature information of the right index finger of the user and the bus card type. The mobile terminal monitors the feature input event by using the payment application in a screen unlocking state, in other words, monitors whether the user enters fingerprint feature information into the mobile terminal, and triggers a corresponding action based on the fingerprint feature information. The following describes an application scenario in this embodiment of this application.

701. A payment application sends a fingerprint monitoring request to a fingerprint service.

702. The fingerprint service monitors a feature input event, and drives a fingerprint collection device on a mobile terminal to collect a fingerprint, to obtain fingerprint feature information of a right index finger.

703. The fingerprint service returns the fingerprint feature information of the right index finger to the payment application.

704. The payment application sends a fingerprint usage query request of the right index finger to a fingerprint management module, where the fingerprint usage query request carries the fingerprint feature information of the right index finger.

705. The fingerprint management module queries a mapping relationship corresponding to the fingerprint feature information of the right index finger, to obtain a mapping relationship between the fingerprint feature information of the right index finger and a bus card type, and a mapping relationship between the fingerprint feature information of the right index finger and a screen unlocking function, and determines, based on the mapping relationship between the fingerprint feature information of the right index finger and the bus card type, a target radio frequency card type corresponding to the fingerprint feature information of the right index finger.

706. The fingerprint management module sends, to the payment application, the target radio frequency card type obtained through querying.

707. The payment application displays a bus card payment screen based on the target radio frequency card type, and invokes a bus card swiping function.

Figure 7:
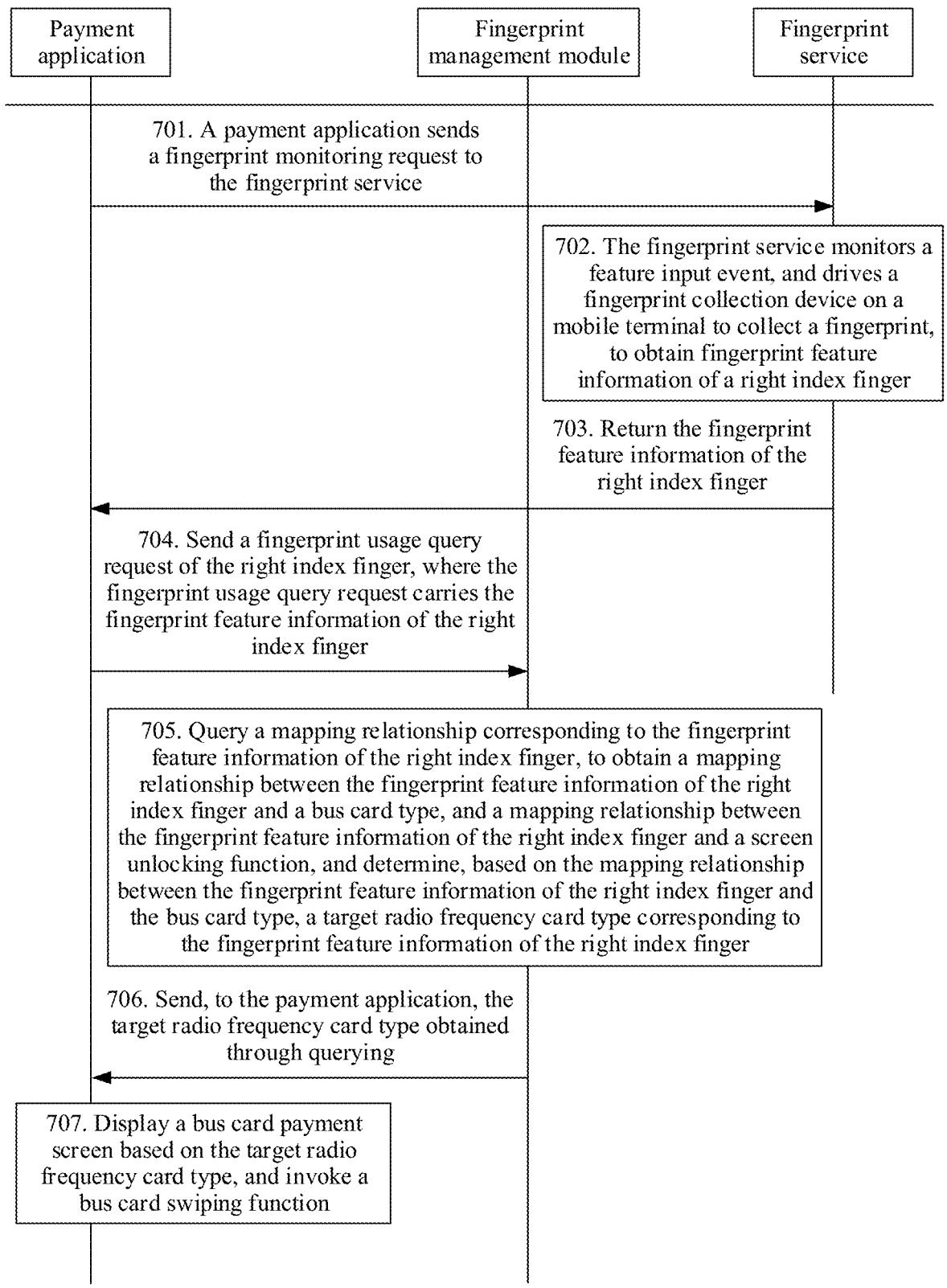
FIG. 7 is a schematic diagram of an application scenario of another method for invoking a radio frequency card function according to an embodiment of this application.

In the scenario shown in FIG. 7, because the mobile terminal is in a screen unlocking state, the fingerprint monitoring request may be sent to the fingerprint service by the payment application. Certainly, the fingerprint monitoring request may alternatively be sent to the fingerprint service by another application. This is not limited in this embodiment of this application.

As described above, feature information of a user in this embodiment of this application may further include voiceprint feature information, palmprint feature information, and gesture feature information. The foregoing scenario is described by using the fingerprint feature information as an example, and does not constitute a limitation on this embodiment of this application. Other application scenarios are not described one by one herein.

To better implement the foregoing solutions in this embodiment of this application, the following further provides a related apparatus configured to implement the foregoing method for invoking the radio frequency card function.

Figure 8:
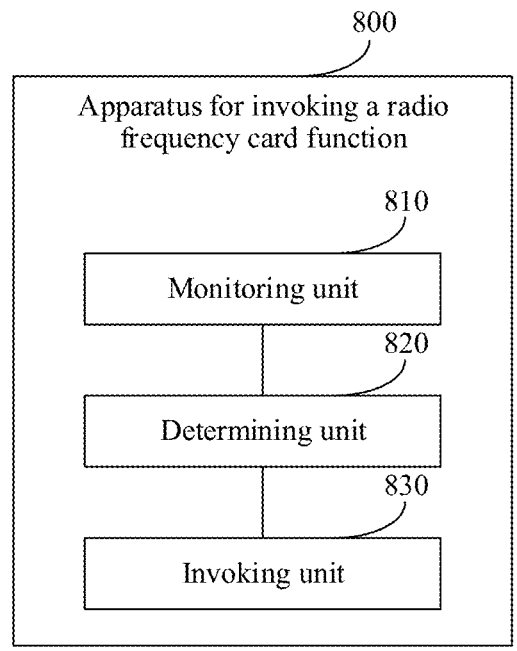
FIG. 8 is a schematic structural diagram of an apparatus for invoking a radio frequency card function according to an embodiment of this application.

FIG. 8 is a schematic structural diagram of an apparatus for invoking a radio frequency card function according to an embodiment of this application.

The apparatus for invoking the radio frequency card function 800 provided in this embodiment of this application may include, for example, a monitoring unit 810, a determining unit 820, and an invoking unit 830.

The monitoring unit 810 is configured to monitor a feature input event, and obtain feature information of a user from the feature input event obtained through monitoring.

The determining unit 820 is configured to determine, based on a mapping relationship between the feature information and a radio frequency card type, a target radio frequency card type corresponding to the feature information of the user.

The invoking unit 830 is configured to invoke a radio frequency card function corresponding to the target radio frequency card type.

In an embodiment, the feature information includes at least one of the following:

fingerprint feature information, voiceprint feature information, palmprint feature information, and gesture feature information.

In an embodiment, the apparatus 800 further includes:

an obtaining unit, configured to, in response to a radio frequency card association request carrying the radio frequency card type, obtain the feature information of the user, and establish the mapping relationship between the feature information and the radio frequency card type.

In an embodiment, that the obtaining unit establishes the mapping relationship between the feature information and the radio frequency card type includes:

performing identity authentication on the user, and if an authentication result succeeds, establishing the mapping relationship between the feature information and the radio frequency card type.

In an embodiment, the performing identity authentication on the user includes:

obtaining an unlock password entered by the user; and performing identity authentication on the user based on a determining result whether the unlock password entered by the user is consistent with a preset unlock password.

In an embodiment, the target radio frequency card type corresponds to a plurality of radio frequency cards, and the invoking unit 830 is specifically configured to:

invoke a radio frequency card function corresponding to a default radio frequency card, where the default radio frequency card is predetermined to be preferentially used in the plurality of radio frequency cards.

In an embodiment, the target radio frequency card type corresponds to a plurality of radio frequency cards, and the invoking unit 830 is specifically configured to:

invoke a radio frequency card function corresponding to a radio frequency card selected by the user from the plurality of radio frequency cards.

In an embodiment, that the determining unit 820 determines, based on the mapping relationship between the feature information and the radio frequency card type, the target radio frequency card type corresponding to the feature information of the user; and the invoking unit 830 invokes the radio frequency card function corresponding to the target radio frequency card type includes:

if the feature information is further used to invoke a screen unlocking function, determining, preferentially based on the mapping relationship between the feature information and the radio frequency card type, the target radio frequency card type corresponding to the feature information of the user, and invoking the radio frequency card function corresponding to the target radio frequency card type.

It should be noted that content such as information exchange between the modules/units of the apparatus and the execution processes thereof is based on the same idea as the method embodiments of this application, and produces the same technical effects as the method embodiments of this application. For the specific content, refer to the foregoing description in the method embodiments of this application. Details are not described herein again.

Figure 9:
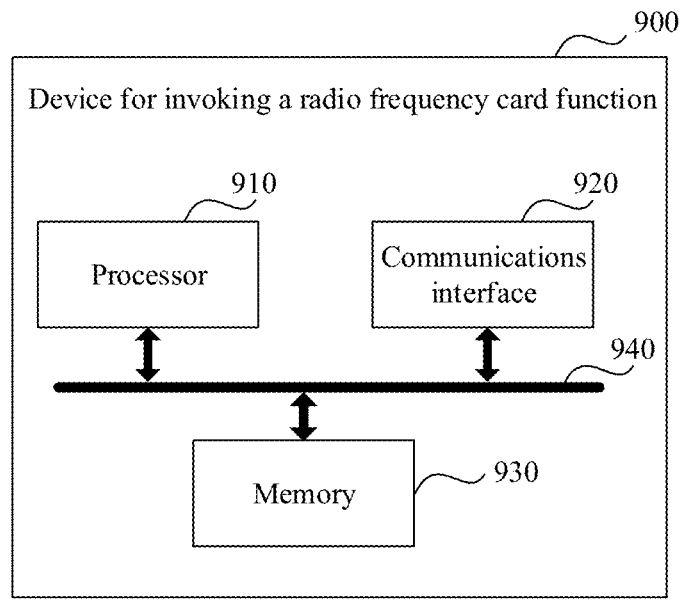
FIG. 9 is a schematic structural diagram of a device for invoking a radio frequency card function according to an embodiment of this application.

The following describes a device for invoking a radio frequency card function in an embodiment of this application. Referring to FIG. 9, the device for invoking the radio frequency card function 900 includes a processor 910, a communications interface 920, and a memory 930. There may be one or more processors 910 in the communications device 900. One processor is used as an example in FIG. 9. In this embodiment of this application, the processor 910, the communications interface 920, and the memory 930 may be connected by using a bus system or in another manner. In FIG. 9, an example in which the processor 910, the communications interface 920, and the memory 930 are connected by using the bus system 940 is used.

The processor 910 may be a central processing unit (CPU), a network processor (NP), or a combination of a CPU and an NP. The processor 910 may further include a hardware chip. The foregoing hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof.

The memory 930 may include a volatile memory, for example, a random-access memory (RAM). The memory 930 may alternatively include a non-volatile memory, for example, a flash memory, a hard disk drive (HDD), or a solid-state drive (SSD). The memory 930 may further include a combination of the foregoing types of memories.

The memory 930 may be configured to store information about various types of radio frequency card.

In an embodiment, the memory 930 stores an operating system and a program, an executable module, or a data structure, or a subset thereof, or an extended set thereof. The program may include various operation instructions, used to implement various operations. The operating system may include various system programs, to implement various basic services and process hardware-based tasks. The processor 910 may read the program in the memory 930, to implement the method for invoking the radio frequency card function provided in this embodiment of this application.

The bus system 940 may be a peripheral component interconnect (PCI) bus, an extended industry standard architecture (EISA) bus, and or the like. The bus system 940 may be classified into an address bus, a data bus, a control bus, and the like. For ease of representation, only one thick line is used to represent the bus in FIG. 9, but this does not mean that there is only one bus or only one type of bus.

An embodiment of this application further provides a computer-readable storage medium, including an instruction. When the instruction is run on a computer, the computer is enabled to perform the method for invoking the radio frequency card function provided in the foregoing method embodiment.

An embodiment of this application further provides a computer program product including an instruction. When the computer program product runs on a computer, the computer is enabled to perform the method for invoking the radio frequency card function in the foregoing embodiment.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (Random Access Memory, RAM), a magnetic disk, or an optical disc.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A method for invoking a radio frequency card function, implemented by a device, comprising:
   receiving a first input selecting a first fingerprint feature information for invoking a first radio frequency card function of a first radio frequency card and unlocking a screen of the device, wherein the first radio frequency card is related to a first application;
   receiving a second input selecting a second fingerprint feature information for invoking a second radio frequency card function of a second radio frequency card and unlocking the screen, wherein the second radio frequency card is related to the first application;
   displaying a locked interface of a locking screen application;
   monitoring a first feature input event on the locked interface;
   obtaining the first fingerprint feature information of a user from the first feature input event;
   in response to the first feature input event, unlocking the device, invoking the first application and invoking the first radio frequency card function from a first application according to the first fingerprint feature information;
   monitoring a second feature input event on the locked interface, and obtaining the second fingerprint feature information of the user from the second feature input event; and
   in response to the second fingerprint feature input event, unlocking the device, invoking the first application and invoking the second radio frequency card function from the first application according to the second fingerprint feature information.

2. The method according to claim 1, further comprising:
   in response to a radio frequency card association request carrying the radio frequency card, obtaining the first fingerprint feature information of the user; and
   establishing a mapping relationship between the first fingerprint feature information and the first radio frequency card.

3. The method according to claim 2, wherein the establishing the mapping relationship between the first fingerprint feature information and the first radio frequency card comprises:
   performing identity authentication on the user, and
   if an authentication result succeeds, establishing the mapping relationship between the first fingerprint feature information and a first radio frequency card type.

4. The method according to claim 3, wherein unlocking the device comprises:
   determining that the first fingerprint feature information is consistent with a preset unlock password; and unlocking the device in response to determining that the first fingerprint feature information is consistent with the preset unlock password.

5. The method according to claim 2, wherein establishing the mapping relationship between the first fingerprint feature information and the first radio frequency card comprises:
  establishing the mapping relationship between the first fingerprint feature information and a target radio frequency card type;
  selecting a default radio frequency card from the target radio frequency card type; and
  invoking a radio frequency card function corresponding to a default radio frequency card, wherein the default radio frequency card is predetermined to be a preferred radio frequency card in the plurality of radio frequency cards.

6. The method according to claim 2, wherein establishing the mapping relationship between the first fingerprint feature information and the first radio frequency card comprises:
  establishing the mapping relationship between a radio frequency card selected by the user and the first fingerprint feature information.

7. The method according to claim 1, comprising:
  invoking a radio frequency card function corresponding to a radio frequency card selected by the user from a plurality of radio frequency cards, or
  invoking a radio frequency card function corresponding to a default radio frequency, wherein a default radio frequency card is an earliest added card, or a latest added card or a most frequently invoked card.

8. A device, comprising:
  a processor; and
  a memory to store an instruction, which when executed by the processor, to cause the device to perform operations of invoking a radio frequency card function, the operations comprising:
    receiving a first input selecting a first fingerprint feature information for invoking a first radio frequency card function of a first radio frequency card and unlocking a screen of the device;
    receiving a second input selecting a second fingerprint feature information for invoking a second radio frequency card function of a second radio frequency card and unlocking the screen;
    displaying, a locked interface of a locking screen application;
    monitoring a first feature input event on the locked interface;
    obtaining the first fingerprint feature information of a user from the first feature input event;
    in response to the first feature input event, unlocking the device and invoking the first radio frequency card function according to the first fingerprint feature information, wherein the first radio frequency card is an access card;
    monitoring a second feature input event on the locked interface, and obtaining second fingerprint feature information of the user from the second feature input event; and
    in response to the second feature input event, unlocking the device and invoking the second radio frequency card function according to the second fingerprint feature information, wherein the second radio frequency card is a bank card.

9. The device according to claim 8, wherein the operations further comprise:
  in response to a radio frequency card association request carrying the radio frequency card, obtaining the first fingerprint feature information of the user, and
  establishing a mapping relationship between the first fingerprint feature information and a first radio frequency card type.

10. The device according to claim 9, wherein establishing the mapping relationship between the first fingerprint feature information and the first radio frequency card type comprises:
  performing identity authentication on the user; and
  if an authentication result succeeds, establishing the mapping relationship between the first fingerprint feature information and the first radio frequency card type.

11. The device according to claim 10, wherein unlocking the device comprises:
  determining that the first fingerprint feature information is consistent with a preset unlock password; and
  unlocking the device in response to determining that the first fingerprint feature information is consistent with the preset unlock password.

12. The device according to claim 9, wherein establishing the mapping relationship between the first fingerprint feature information and the first radio frequency card comprises:
  establishing the mapping relationship between the first fingerprint feature information and a target radio frequency card type;
  selecting a default radio frequency card from the target radio frequency card type; and
  invoking a radio frequency card function corresponding to a default radio frequency card, wherein the default radio frequency card is predetermined to be a preferred radio frequency card in the plurality of radio frequency cards.

13. The device according to claim 9, wherein establishing the mapping relationship between the first fingerprint feature information and the first radio frequency card comprises:
  establishing the mapping relationship between a radio frequency card selected by the user and the first fingerprint feature information.

14. The device according to claim 8, wherein the operations further comprise:
  invoking a radio frequency card function corresponding to a radio frequency card selected by the user from a plurality of radio frequency cards, or
  invoking a radio frequency card function corresponding to a default radio frequency, wherein a default radio frequency card is an earliest added card, or a latest added card or a most frequently invoked card.

15. A non-transitory computer-readable storage medium storing a program to be executed by a processor, the program including instructions for:
  receiving a first input selecting a first fingerprint feature information for invoking a first radio frequency card function of a first radio frequency card and unlocking a screen of a device;
  receiving a second input selecting a second fingerprint feature information for invoking a second radio frequency card function of a second radio frequency card and unlocking the screen;
  displaying, a locked interface of a locking screen application;
  monitoring a first feature input event;
  obtaining the first fingerprint feature information of a user from the first feature input event;

in response to the first feature input event, unlocking the device and invoking a first radio frequency card function of a first radio frequency card according to the first fingerprint feature information, wherein the first radio frequency card is an access card;

monitoring a second feature input event on the locked interface, and obtaining second fingerprint feature information of the user from the second feature input event; and in response to the second feature input event, unlocking the device and invoking a second radio frequency card function according to the second fingerprint feature information, wherein the second radio frequency card is a bank card.

* * * * *